United States Patent [19]

Chen et al.

[11] Patent Number: 5,694,471

[45] Date of Patent: Dec. 2, 1997

[54] COUNTERFEIT-PROOF IDENTIFICATION CARD

[75] Inventors: James F. Chen; Jieh-Shan Wang, both of Potomac, Md.

[73] Assignee: V-ONE Corporation, Rockville, Md.

[21] Appl. No.: 285,134

[22] Filed: Aug. 3, 1994

[51] Int. Cl.$^6$ .................... H04L 9/00; H04L 9/30
[52] U.S. Cl. .................. 380/25; 380/4; 380/9; 380/23; 380/24; 380/30; 380/49; 235/379; 235/380
[58] Field of Search .................... 380/4, 9, 23, 24, 380/25, 30, 49, 50, 21; 235/379, 380

[56] References Cited

U.S. PATENT DOCUMENTS

| | | | |
|---|---|---|---|
| 4,453,074 | 6/1984 | Weinstein | 380/23 |
| 4,879,747 | 11/1989 | Leighton et al. | 380/23 |
| 4,910,774 | 3/1990 | Barakat | 380/23 |
| 4,995,081 | 2/1991 | Leighton et al. | 380/23 |
| 5,396,558 | 3/1995 | Ishiguro et al. | 380/25 |
| 5,434,917 | 7/1995 | Naccache et al. | 380/23 |
| 5,446,796 | 8/1995 | Ishiguro et al. | 380/24 |
| 5,502,765 | 3/1996 | Ishiguro et al. | 380/24 |

OTHER PUBLICATIONS

McGraw–Hill Encyclopedia of Science and Technology, vol. 4, 1987, New York pp. 554–562.

*Primary Examiner*—Bernarr E. Gregory
*Attorney, Agent, or Firm*—Bacon & Thomas

[57] ABSTRACT

A system and method for preventing counterfeiting of an identification or transaction card, and for verifying that the user of the card is an authorized user, involves the use of a unique, unalterable serial number and an exclusive OR function to generate a private key protected digital signature. The digital signature is stored on the card together with a card issuer record which contains sufficient information to authenticate the record. User authentication is provided by a personal identification number which is stored on the card. The personal identification number is generated by enciphering the serial number using a password as the key. The same card can be used to store a plurality of card issuer records, each including its own digital signature, and with user authentication for all records provided by a single personal identification number.

33 Claims, 5 Drawing Sheets

1

COUNTERFEIT-PROOF IDENTIFICATION CARD

BACKGROUND OF THE INVENTION

1. Field of the Invention

This invention relates to the field of cryptography, and more particularly to a system and method for preventing fraudulent use of identity and/or transaction cards by enabling authentication of both the card and its user. The system and method relate to both the use of a private key enciphered digital signature for card authentication and password protection for user authentication. In addition, the system and method provide for protection of the password and digital signature from copying through the use of a serial number unique to the card and which is used in both the card and user authentication schemes. The invention also relates to a card and user authentication system and method designed to avoid the need for sophisticated on-board processing, thus enabling the system and method of the invention to be used in connection with an inexpensive integrated circuit card, as opposed to a processor-based "smart card."

2. Description of Related Art

The present invention makes use of a public key-private key cryptosystem, mathematical techniques such as one-way hash functions, and password encryption, all of which are well-known, but not in the combination described later in the application. In addition, the invention makes use of the serial number conventionally burnt into integrated circuits by integrated circuit manufacturers.

A detailed description of public key-private key and other cryptographic systems can be found in the article entitled "Cryptography" by Meyer et al. in volume 4 of the *McGraw-Hill Encyclopedia of Science and Technology*, 6th Ed. (1987). Such cryptosystems are conventionally implemented through the use of organizations known as key servers which protect the private key on behalf of a requester and communicate with the requester by means of a secured communications link. The server supplies the requester with a public key which cannot be deduced from the private key but which is related to the public key to permit anyone with access to the public key to decipher the information enciphered with the private key. The security provided by such a system depends both on protection of the private key, which can be ensured in a variety of ways, and on the difficulty of deducing the private key from the public key. A number of algorithms are currently available to key servers which make the process of calculating the private key from the public key virtually impossible using presently available computing technology.

The specific problem addressed by the present invention is that of identity or transaction card security. Cards having personal dam stored thereon are used in numerous different contexts, most of which are subject to fraud by forgery or theft of the cards. Forgery and theft present different security problems. Forgery or counterfeiting of the card involves duplication of the card so that it contains data which, ideally, is personal to the unauthorized carrier of the card, making it appear as if the carrier is authorized. This problem is addressed by techniques referred to herein as card authentication techniques. User authentication techniques, in contrast, are designed to prevent an unauthorized carrier of a card from using the card when the information on the card does not belong to the carrier. User authentication techniques cannot by themselves prevent fraudulent use of a card by forgery, and in addition may be subject to mimicking by the unauthorized user of authorized user characteristics or responses (e.g., forgery of signatures, the use of disguises where the user information is in the form of an image, and theft of passwords). Theft of passwords is a particular problem in the case where the authorized user possesses a number of different cards, each with its own arbitrary password, and the user is thus forced to write down the passwords and keep them with the associated cards.

Recently, a number of systems have been proposed which attempt to solve both the card authentication and user authentication problems by providing systems which use the card to store "digital signatures" containing encrypted user authentication information (either in the form of a password or representations of user characteristics such as signatures or fingerprints), thereby protecting the user verification information and at the same time authenticating the information by making it impossible in practice to duplicate the card using the same techniques by which the genuine card is created. User authentication is accomplished in these types of systems either by decrypting an encrypted password stored on the card, which is then compared with a password entered by the user, or by interactive comparison of a verifiable characteristic or response from the user with corresponding decrypted representations stored on the card. U.S. Pat. No. 4,995,081 (Leighton et al.), discloses, for example, a digital signature generating system involving enciphering of a concatenated password and verifiable user information for storage on the card, and authentication by showing that the digital signature was generated from the password, and authentication of the user by an interactive process involving comparison of some verifiable user characteristic or information with a representation of the characteristic or information extracted form the digital signature by means of the password. An earlier system, disclosed in U.S. Pat. No. 4,453,074 (Weinstein) involves enciphering of a password using a private key cryptosystem and storing the enciphered password on the card, with user authentication by comparing the deciphered password with a password entered by the user.

Systems of the type disclosed in the Leighton et al. and Weinstein patents share at least two major flaws addressed by the present invention: The first is that neither system prevents an existing card from being physically duplicated with the encrypted data intact, as opposed to forgery in which new cards are made with unauthorized data by recreating the encryption process through knowledge of the private key. The second is that both systems are expensive to implement, requiring sophisticated processing terminals and "smart cards" with data processing capabilities over and above that provided by the key server and conventional card initialization or transaction processing terminals.

The first flaw involves the problem that encrypted data can be copied without knowing its content, just as executing the "copy" command on a personal computer copies an application data file even without possession of an application program which can read and interpret the data file. Any binary data can be copied in this manner by simply repeating the pattern of ones and zeroes stored in the information medium which contains the data, whether that medium is an integrated circuit memory, a magnetic medium, or an optical medium.

The second flaw relates to the principle that a fraud prevention system is useless if it costs more to implement than the losses attributable to fraud. While conventional integrated circuit cards are already in widespread use in Europe and Japan, smart cards are conventionally used only as computer peripherals because of their vastly greater cost.

As a result, even though systems such as those disclosed in the Leighton et al. and Weinstein patents offer increased security over conventional transaction and identification cards (despite the flaw described above that they are subject to counterfeiting by blind copying), neither system has been accepted for widespread use by issuers of transaction or identity cards because of their cost.

The present invention, in contrast, offers a card which can not be duplicated by either duplicated by either recreating the manner in which the card is encoded or by copying of already encrypted data. The invention thus provides a level of security which exceeds that provided by the Leighton et al. and Weinstein systems. At the same time, the invention is more practical to implement than the systems described in the Leighton et al. and Weinstein systems, and other similar systems, because it is capable of using inexpensive integrated circuit card technology of the type already in relatively widespread use. In addition, as will become apparent from the following description, the invention offers the possibility of further decreasing costs by allowing different issuers to use the same card, a possibility not even contemplated by previously proposed card or user authentication systems.

SUMMARY OF THE INVENTION

It is accordingly a first objective of the invention to overcome the shortcomings of prior card and user authentication systems by providing an identification and/or transaction card, and a system and method for storing data on the card, which prevents not only forgery of the card, but also duplication of the existing card by copying.

It is a second objective of the invention to provide a system and method for authenticating a card and its user which overcomes the shortcomings of prior card and user authentication systems and methods by making possible authentication of the card and card user through use of an inexpensive integrated circuit card which stores the encrypted data and provides additional password protection without the need for additional on-board or smart processing capabilities.

It is a third objective of the invention to provide a system which overcomes the shortcomings of prior card authentication systems by providing a well defined means for allowing multiple issuers to use the same card. Instead of each issuer having to produce its own secure cards, one card can serve the needs of all issuers, requiring the user to memorize only one password and not one for each card, and thereby lowering costs while at the same time reducing the chance that the cardholder will need to write down and carry the password with the card.

These and other objectives and advantages of the invention are accomplished by providing, according to a preferred embodiment of the invention a system and method of creating counterfeit-proof identification cards which involves generating a digital signature using the following elements: a.) an unalterable serial number which uniquely identifies the information storage medium on which the digital signature will be stored, b.) an issuer identification number which uniquely identifies the issuer of the card, c.) the private key of a public key-private key pair, and d.) at least part of the user information to be stored on the card. The digital signature is obtained, according to a preferred embodiment of the invention, by computing a function of the issuer identification number and the user information to obtain a checksum and then combining the checksum and the unique serial number into a composite result, the composite result being encoded using the private key of the public key-private key pair to obtain the digital signature. For example, the user information and serial number and issuer identification number are preferably combined using a one-way hashing function to obtain the checksum, the checksum and unique serial number being combined using an exclusive OR operation to obtain the composite result. The use of the exclusive OR operation to obtain the composite result is particularly advantageous because it is extremely simple to implement and yet makes it impossible to work backwards to determine the checksum unless both the composite result and the unique serial number are correct, although those skilled in the art will appreciate that use of the exclusive OR operation may be replaced by other methods of obtaining a composite result from the checksum and serial number. Since the composite result can be protected by private key enciphering algorithms which are impossible to break using currently available computing technology, and since the serial number can in practice only be placed on the card by a chip manufacturer, counterfeiting of the card provided by the preferred embodiment of the invention can truly be said to impossible for anyone not in possession of the private key and integrated circuit manufacturing capabilities.

Authentication of the card, in the preferred embodiment of the invention, begins with retrieval of the public key and the issuer's identification number stored on the card. The digital signature is deciphered using the public key to recover the composite result, and an exclusive OR operation is performed on the composite result and the unique serial number in order to extract the checksum. This extracted or recovered checksum can then be compared with a computed checksum obtained by performing the one-way hashing function on the issuer identification number and the user information, which is the way the recovered checksum was originally computed. The two checksums will match only if the user information on the card and the unique serial number are correct.

Authentication of the user in the preferred embodiment of the invention involves, on the other hand, storing a personal identification number on the card which is obtained by encoding the card's unique serial number as a function of a user password. Only the encoded serial number needs to be stored on the card since user verification can be accomplished by simply comparing the personal identification number stored on the card with a computed personal identification number obtained by again encoding the unique serial number using a password entered by the user. Unless the password and serial number used to obtain the currently computed personal identification number are the same as those used to compute the stored personal identification number, the user is rejected. The personal identification number is preferably encoded using the password as a key to encipher the serial number, although other methods could also be used to generate a personal identification number which combines both the serial number and the password, including one-way hashing functions and other irreversible functions for preventing the password from being extracted by analyzing the personal identification number stored on the card.

The card itself, according to the preferred embodiment of the invention, has stored thereon, in addition to the unique serial number, at least: a.) a data string made up of user information which depends on the purpose for which the card is to be used, such as account information for a credit or ATM card, b.) the issuer identification number, c.) the public key, d.) the above-described digital signature, and e.)

the above-described personal identification number. Items a–d are preferably stored in the form of a record searchable by the issuer identification number, which provides the advantage that more than one individually authenticatable record with its own digital signature can be stored on the card and retrieved according to the stored issuer identification number in the record. According to a particularly advantageous version of this embodiment, the records can share data by providing, in association with each individual record, a pointer which calls data from another record. This feature has the advantage that, not only can different issuers share the same card, but they can do so for different purposes, the card being encoded by one card issuer, for example, for identification purposes, by another issuer for credit transactions, and a third as a debit card. The result is a truly "universal" card which provides card authentication to protect against forgery and copying, and also user authentication using a single password for all card functions.

BRIEF DESCRIPTION OF THE DRAWINGS

FIG. 3a is a schematic representation of a card encrypted according to the method of the preferred embodiment of the invention.

FIG. 3b is a schematic representation of the tree structure of the information records store on the card illustrated in FIG. 3a.

DETAILED DESCRIPTION OF THE PREFERRED EMBODIMENTS

The preferred embodiments of the invention include a system made up of equipment for storing information on an identification and/or transaction card, a method of storing information on the card, a method of authenticating the card, a method of authenticating a user of the card, and the card itself. While described separately below, it will be appreciated by those skilled in the art that the invention is also a unified whole, with each part dependent on the other.

1. Equipment Needed to Implement the Preferred System

Figure 1:
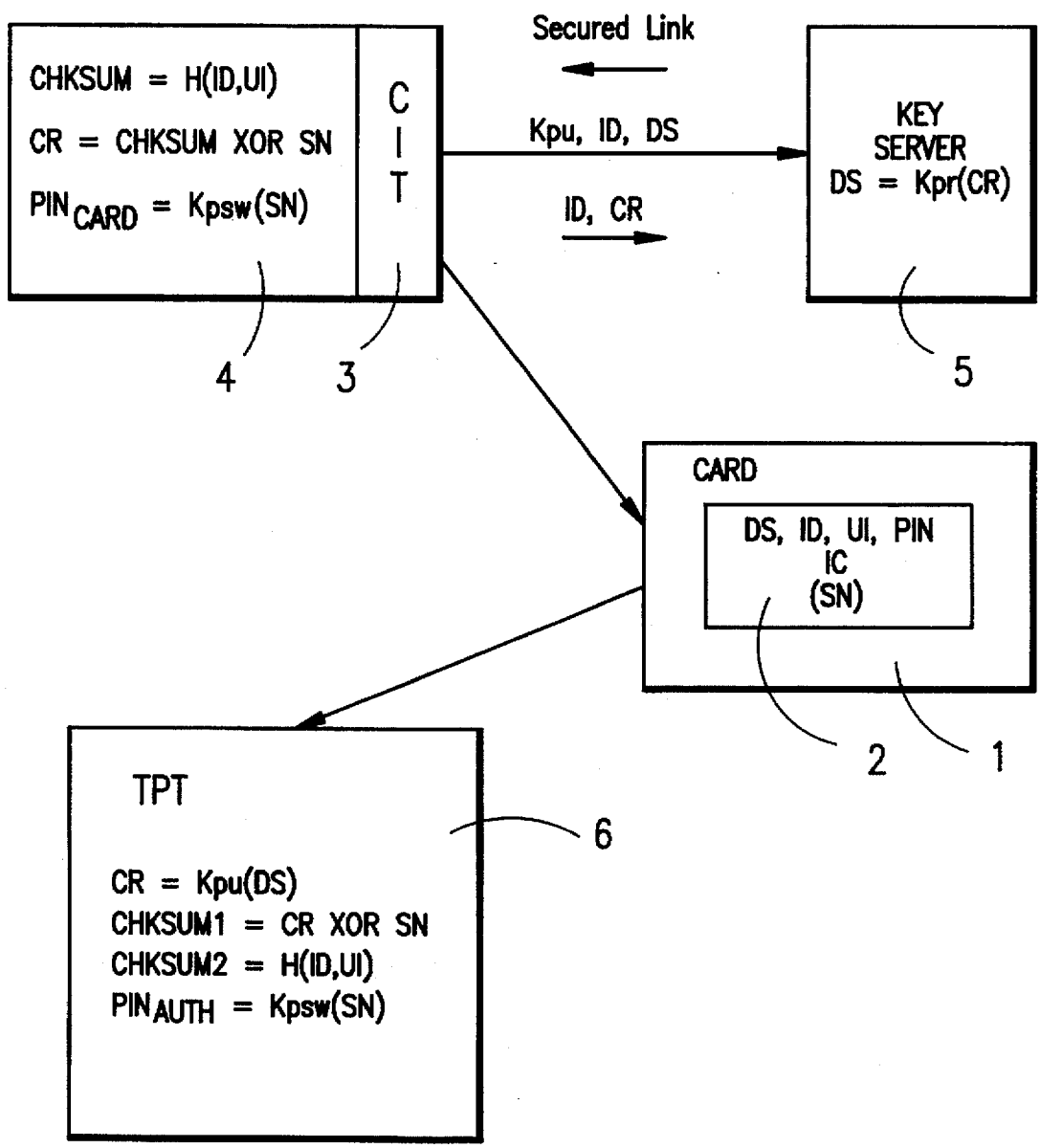
FIG. 1 is a functional block diagram of a system constructed in accordance with the principles of a preferred embodiment of the invention.
Figures 3A, 3B:
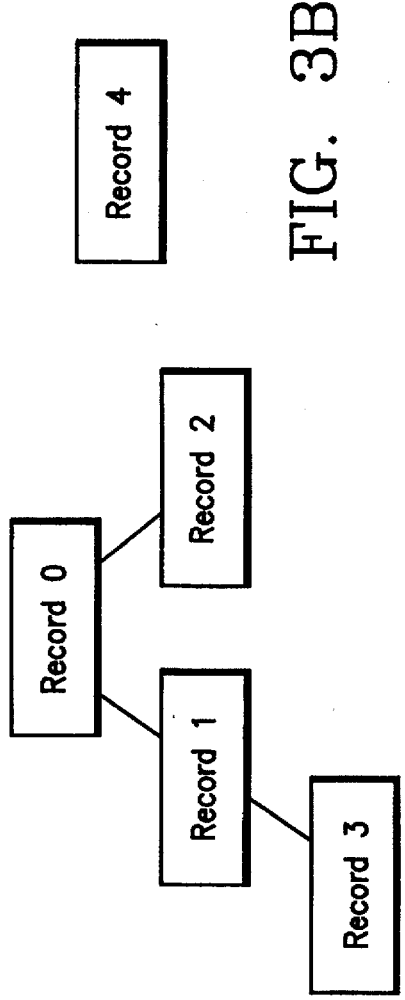

In the preferred embodiment of the invention, as illustrated in FIG. 1, the card itself is a chipcard 1 of the type which includes an integrated circuit 2 having sufficient storage capability to store information about the user and/or an account held by the user. The user information can be in the form of an image of the user or his or her signature, an account number, name and address, and any other information conventionally associated with an identification or transaction card such as a credit card or automated teller machine (ATM) card. Details of the manner in which the items stored on the card are organized according to the preferred embodiment are shown in FIGS. 3a and 3b and described in detail below.

Those skilled in the art will appreciate that the broader principles of the invention are not limited to application to chipcards, or even to cards in general, but rather may have application to storage mediums other than integrated circuit or other types of cards, including virtually any portable information storage medium capable of being provided with a unique and unalterable serial number, and of having the below-described data stored thereon. While the invention makes it possible to avoid the use of smart cards, resulting in cost savings over prior methods, the invention could also be practiced using smart cards if cost is not a problem or, for example, if the processing capabilities of the smart card are needed for some reason other than card and user authentication. Because the integrated circuit card is currently the preferred application, however, the remainder of the description shall refer to the storage medium as an integrated circuit card.

To prevent duplication of an improperly acquired obtained card, the card 1 must have a unique serial number permanently and unalterably affixed thereto, such as by burning the serial number into the chip. This serial number may, for example, be provided by the card or IC manufacturer independently of the card encoding procedure, assuring independence of the serial number, and avoiding any association between the card issuer or user and the serial number. Currently, integrated circuit manufacturers routinely place consecutive but unique serial numbers on each chip manufactured. Such serial numbers are ideal for use in the present system since only a chip manufacturer could reproduce the serial number. Permanently and unalterable affixing a serial number to a chip is in general an easy and low-cost procedure for a chip manufacturer, but is impossible for those not equipped with chip manufacturing capabilities. Those who acquired cards from a manufacturer in order to duplicate an encoded card would be unable to do so because of the different serial numbers for each card.

Aside from the serial number, the integrated circuit 2 of the preferred card 1 must simply provide sufficient memory for storing issuer information, a digital signature, an issuer identification number, a public key, and the user's personal identification number (which is to be distinguished from the user's password, as will be described below), and thus the preferred system can easily use the type of conventional IC card already in widespread use, particularly in Europe and Japan, for such purposes as "phonecards" for operating public telephones. Storing image information such as a photograph requires a higher memory, but well within the reach of conventional technology.

The preferred invention requires a conventional card initialization terminal 3 capable of writing information to the integrated circuit 2 on the card 1. In addition, the card issuer must be capable of performing a one-way hashing function on the issuer identification number and the user information to obtain a checksum, performing an exclusive OR operation on the checksum and the serial number to obtain a composite result, and the ability to encipher the serial number using the password as the key to obtain the PIN. These functions and operations can easily be performed using a general purpose computer 4, which may be either separate from or an integral part of the Card Initialization Terminal (CIT) 3.

The digital signature is preferably generated by an organization known as a key server 5. A key server is a private or public agency which generates keys and specializes in storing and keeping the private keys secure. Those skilled in the art will appreciate that the use of a key server provides additional security, but that it is also possible for the issuer to generate its own public key-private key pair. Requests to the key server and transfer of information from the key server to the card issuer are preferably carded out over a secured communications link between the key server and the issuer's GIT 3.

The apparatus 6 used to authenticate the card is referred to herein as a transaction processing terminal (TPT). The TPT can, like the GIT 3, be essentially conventional. The TPT must be capable of reading information stored on the card and must include a keypad or the like for allowing entry of a password by the card user. The mathematical functions which must be carried out by the TPT can easily be programmed into the terminal as software, and do not require substantial processing power (the card itself requires no additional processing capabilities). These mathematical functions are that the TPT must be able to decipher the digital signature using the public key stored on the card to recover the composite result (or be able to communicate the public key and digital signature to the key server or to a central location for deciphering), performing an exclusive OR operation on the composite result and serial number to obtain a first checksum, performing the one-way hash function on the issuer identification number and some or all of the user information to obtain a second checksum, and comparing the first and second checksums to authenticate the card. In addition, for the purpose of authenticating the user of the card, the TPT need to be able to compute a personal identification number for comparison with the personal identification number stored on the card by enciphering the serial number using the entered password as the key and comparing the computed personal identification number with the stored personal identification number. Once the card and user are authenticated, the TPT displays and/or uses the information on the card in conventional fashion.

2. Method of Storing Information on the Card

Figure 2:
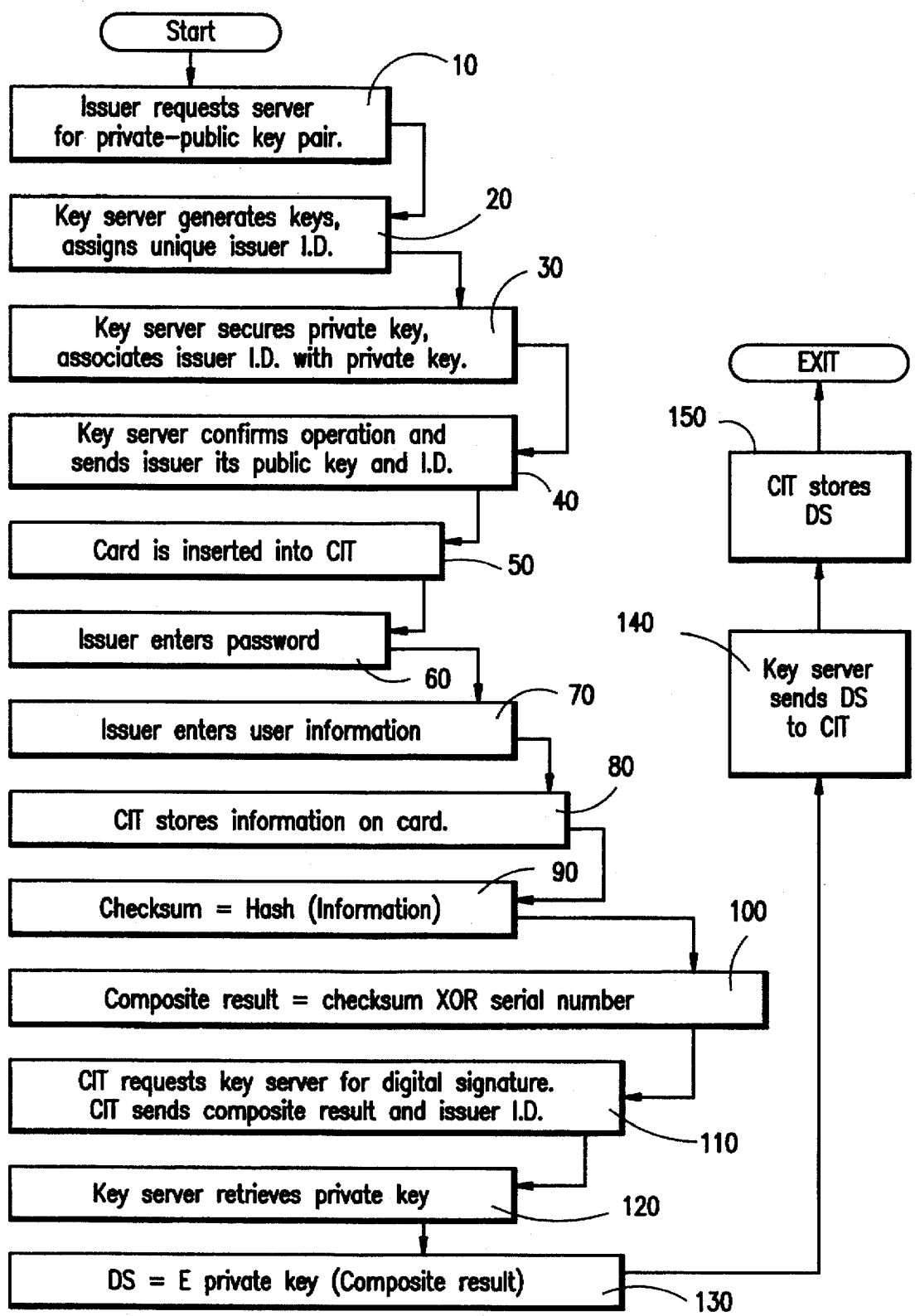
FIG. 2 showing a method of encrypting a card illustrated the principles of a preferred embodiment of the invention.

FIG. 2 illustrates the method by which information is stored on a transaction or identification card according to the preferred embodiment of the invention.

Initially, in step 10, the issuer requests a private-public key pair from a key server 5, described above in connection with FIG. 1. Upon receiving the request from the issuer, the keys are generated and a unique issuer identification number (ID) is assigned to the issuer (step 20). Once the keys are generated, the private key is associated by the key server with the issuer's identification number (step 30) so that the private key can be retrieved based on the issuer identification number, operation of the cryptosystem is confirmed, and the public key and identification number are sent over a secure communications link to the issuer (step 40).

The next step in the card initialization process occurs at the issuer's location, using CIT 3. After inserting a blank card into the CIT (step 50) the issuer enters its issuer identification number through a keypad or other data entry means on the CIT (step 60). While the blank card is in the CIT, the user also enters card holder and issuer information, including the issuer's identification number which had been assigned by the key server, and the public key (step 70), and the information thus is stored on the card (step 80).

Next, a checksum is generated (step 90) by performing a one-way hashing function on all or part of the user information (UI) to be stored on the card and the issuer's identification number (H(ID,UI)=CHKSUM), where H is a "one-way" or irreversible hash function, for example the currently preferred "MD5" message authentication code (MAC), although those skilled in the art will appreciate that numerous other irreversible functions and message encoding schemes may be used in place of the preferred one-way hash function.

The checksum is then combined (step 100) with the unique serial number (SN) which is burnt into the card or integrated circuit embedded into the card to obtain a composite result CR. The combination is via an exclusive OR (XOR) gate, all bits which are different are assigned the value 1 in the combination and all like bits are assigned the value zero (i.e., (CHKSUM XOR SN)=(H(ID,UI)XOR SN)=CR).

Next, the CIT sends the composite result and the issuer identification number to the key server together with a request for the private key associated with the issuer's identification number (step 110), the key server retrieves the private key (step 120), and a digital signature DS is generated (step 130 by enciphering the composite result using the private key (i.e., $E_{Kpr}(CR)=E_{Kpr}(H(ID,UI)XOR\ SN)=DS$, where E represents the enciphering operation for private key Kpr. The digital signature is then sent by the key server back to the card issuer (step 140) for storage on the card (step 150) together with the user information, issuer identification number, and public key Kpu used in the card authentication procedure described below.

Uniquely, the preferred method allows additional issuers to add their information to the card in the same manner as the original issuer. In addition, a new issuer can draw upon the information of previous users by linking its information to a previous issuer's, as will be described in the following section.

3. Arrangement of Information on the Card

As a result of the procedure shown in FIG. 2, the card now contains information in the form shown in FIG. 3a, although those skilled in the art will appreciate that the format can be varied to suit the needs of the issuer, so long as the card contains at least fields 1000–1004 for, respectively, a data string made up of user information, the issuer ID, the public key Kpu, and the digital signature DS. As shown in FIG. 3a, the record stored on the card also contains the expiration date of the cardholders account in a separate field, as well as a separate field containing pointers which allow separate issuers to share information on the card while maintaining unique issuer ID numbers and digital signatures. It will be appreciated by those skilled in the art that while a record number field 1006 is illustrated as being part of the record, its presence on the card is not required.

The illustrated card contains, in addition to the above-described fields, a pointer field 1005 which allows a plurality of records, each with its own digital signature, to be stored on the card for one or more issuers. When the card is read, the relevant record is identified according to the issuer's ID, and then a pointer associated with the information is read. Depending on the value of the pointer, the reader can access information in other records during a reading operation. The card thus carries at least one record, the above-described unique serial number manufactured into the card (represented by memory location 1007, and a single personal identification number (PIN) which is stored at memory location 1008 and developed by encrypting the serial number with the user password, as will be explained below.

When a new issuer wishes to add an entry to the card, it may want to connect its record with that of another issuer. The new issuer does this by storing a pointer to the other record. Storing a pointer to another record implies that the issuer trusts the information stored by the issuer record it points to. When a card authentication is performed, the authenticity of all information pointed to will be verified before a card is accepted as authentic. The new issuer may then store its information just as the original entry did, the information being run through a one way hashing function and XORed with the SN, the result being encrypted using the issuer's private key to obtain a digital signature unique to the new issuer's record.

The illustrated pointers create a hierarchal tree structure of records. Each new issuer is a branch of the issuer that it points to. FIG. 3B shows the tree structure of the records shown in FIG. 3A. The pointers of the various records form one or more chains of information. An entry has access to all the information that is pointed to in the chain. In other words, with reference to the tree structure in FIG. 3B, a record has access to all records above it in the tree. Entry 0, the original entry, points to NULL and forms the root of a tree structure, having access to only the information stored in it. Entries 1 and 2 have access to their own information as well as that of entry 0. Entry 3 can access its own information as well as that of entries 0 and 1. Entry 4 points to NULL, meaning that it can only access its own information. It starts a second tree structure.

It will be appreciated by those skilled in the art that each record whose pointer points to another record has to rely on the accuracy of the information it is linked to. Therefore, when a card authentication is performed, the TPT 6 (see FIGS. 1, 4, and 5) will check the authenticity of the information stored in the entry corresponding to the owner of the TPT as well as the authenticity of all entries above that entry in the tree structure. Entries can only link themselves to previous entries already stored on the card.

4. Procedure for Authenticating the Card

Figure 4:
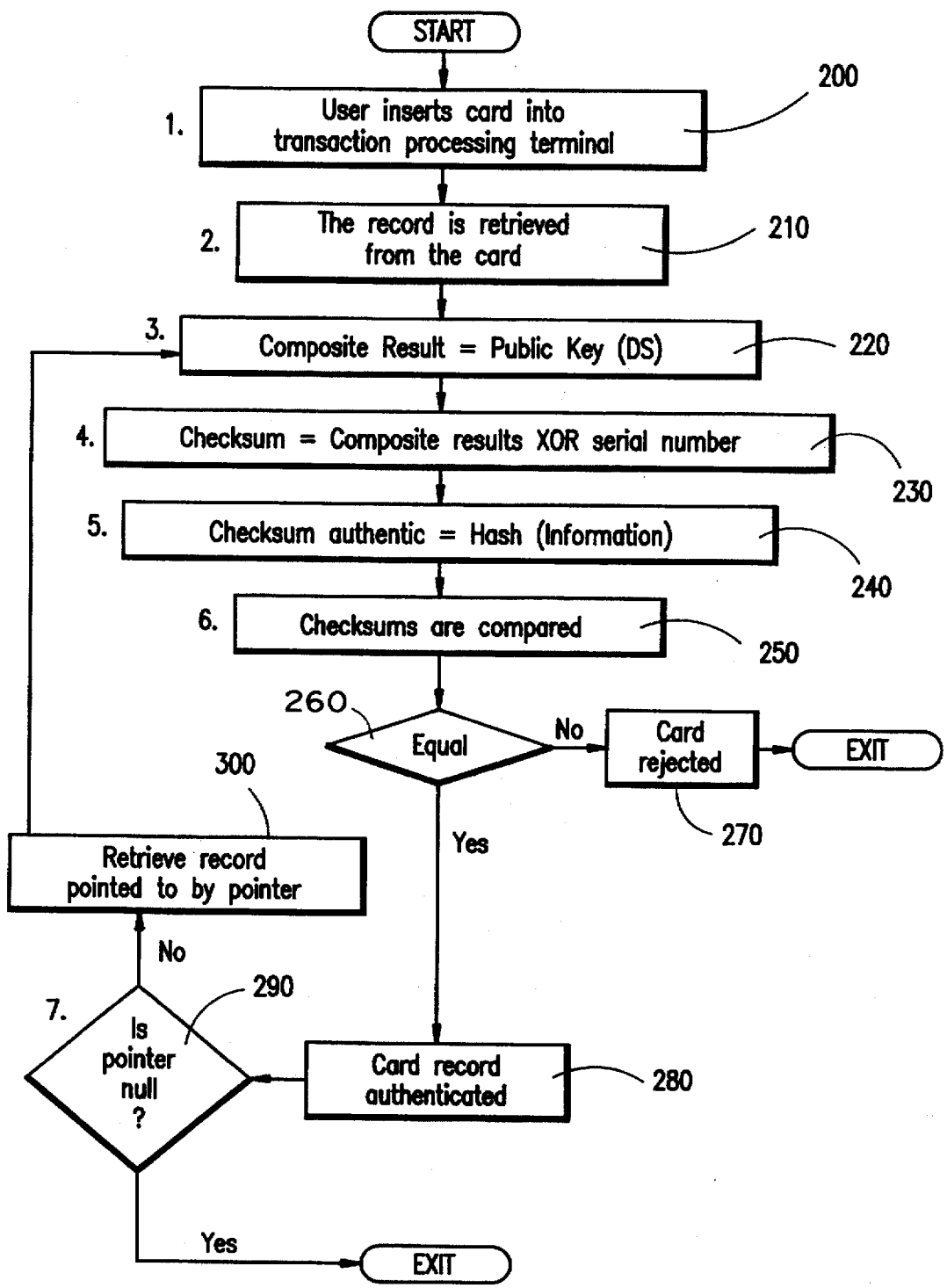
FIG. 4 is a flowchart of a preferred method for authenticating a card encrypted according to the method shown in FIG. 1.
Figure 5:
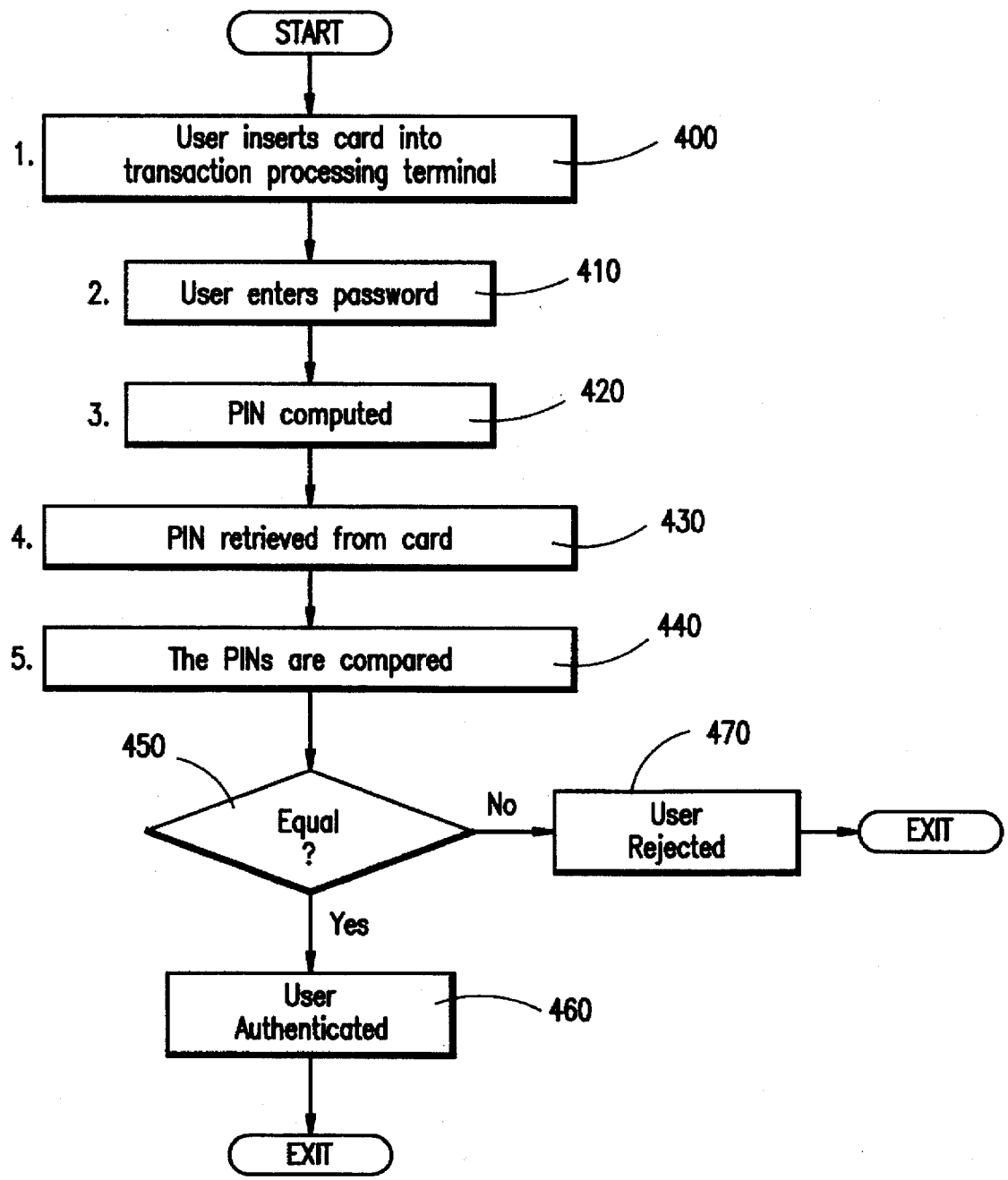
FIG. 5 is a flowchart of a preferred method for authenticating a user of the card encrypted according to the method shown in FIG. 1.

The procedure for authenticating the card, i.e., for determining whether the card is an unauthorized copy or forgery, is illustrated in FIG. 4. This procedure is to be distinguished from the procedure shown in FIG. 5, which determines, after authentication of the card, whether the person presenting the card is an authorized cardholder. Unlike prior systems, the present system is capable of accomplishing both tasks based on the information stored on the card, without the need for advanced on-board processing or smart card functions.

Verification can be performed without prior information about the card and user, and thus verification can be performed at a conventional transaction processing terminal (TPT) capable of reading the medium in the which the information is stored, such as an automatic teller machine (ATM) of the type used by banking institutions to enable account holders to perform various transactions without the need for human intervention during the transaction. As shown in FIG. 4, the first step in the card authentication process (step 200) is for the card holder or user to insert the card into the processing terminal, whereupon the terminal retrieves the record from the card, using pointers if necessary, based on the issuer ID number stored on the card and associated with the relevant record (step 210).

The transaction processing terminal then decrypts the record's digital signature (step 220) using the public key Kpu stored in the record to obtained the composite result ($D_{Kpu}[DS]=D_{Kpu}[E_{Kpr}(CR)]=CR$, where D represents the deciphering operation and E represents the encryption operation described above which was performed during card initialization). The composite result is then XORed with the card's unique serial number to obtain a recovered checksum (step 230), and another checksum is computed directly from the information record by running the issuer ID and public key through a one-way hashing function, just as was done to create the original checksum which, assuming that the digital signature is secure, will be the same as the recovered checksum (step 240). The resulting checksums are then compared (steps 250 and 260) and if either the digital signature or the information record was altered, the results will not match and the card is rejected (step 270) or confiscated. If the checksums match, the card record is authenticated (step 280), and the pointer field is checked (step 290) to determine whether another record needs to be retrieved (step 300) and steps 220–290 repeated for the next record. If the pointer is null, authentication of the card holder can proceed using the process illustrated in FIG. 5.

5. Procedure for Authenticating the User

If the card is not already in the TPT, it is inserted or reinserted (step 400), and the user enters the password (PSW) assigned to the card (step 410) via a keypad or other data entry means on the TPT. From the password, a personal identification number $PIN_{user}$ is computed (step 420) by encrypting the serial number stored on the card using the password $PSW_{user}$ as the key ($PIN_{user}=E_{PSWuser}(SN)$), and compared with the personal identification number $PIN_{card}$ retrieved from the card (steps 430–450), the stored personal identification number having been originally generated during card initialization using the password supplied to the authorized user ($PIN_{card}=PSW_{auth}(SN)$). If the personal identification number computed by the TPT is equal to the stored personal identification number, the user is authenticated (step 460), but if the respective personal identification numbers are not equal, the user is rejected (step 470) and the transaction is terminated.

6. Variations of the Illustrated Embodiments

The purpose of using an irreversible function to combine the issuer identification number and the user information is to prevent the original information from being reconstructed based on a checksum recovered from the digital signature should the original information have become corrupted. However, those skilled in the art will appreciate that it is not necessarily required for security purposes to use an irreversible function for coding algorithm to compute the checksum. Similarly, if card copying is the sole concern, it may be sufficient to practice the invention based solely on the principle of using a function of the serial number and the user information to create a stored checksum for comparison with a checksum computed using the same function of the serial number and user information at the time of authentication, although this variation would be much less effective than the combination of a one-way hash function, exclusive OR operation, and private key-public key cryptosystem which makes up the preferred embodiment.

In addition, the method will work equally well if the serial number is hashed with the user information, and the issuer identification number is exclusive ORed with the checksum or with the user information, and so forth, with corresponding modifications to the card authentication sequence. Also, when verifying the card, the information may be hashed and exclusive ORed with the serial number instead of exclusive ORing the decrypted digital signature with the serial number. The order in which the steps are implemented is not important. In other words, the relationship $E_{Kpr}(CR)=E_{Kpr}(H(ID,UI)XOR\ SN)=DS$ described above may be replaced by the relationship $E_{Kpr}[CR]=E_{Kpr}[F(x,y)XOR\ z]=DS$, where F is any function of x and y (though preferably a one-way function), and where x, y, and z can be selected in any order from the set consisting of the user information, issuer identification number, and the serial number ($x \in \{UI,$ ID,SN}, y∈{UI,ID,SN}, and z∈{UI,ID,SN}), so long as all three variables UI, ID, and SN are present somewhere in the composite result.

Accordingly, in view of the numerous variations and modifications which are possible within the spirit of the invention, it is intended that the above description not be taken as limiting, but rather that it be defined solely by the appended claims.

We claim:

1. A system for enciphering information onto cards, each card having permanently stored thereon a serial number unique to the card, and for authenticating the cards and users of the cards, comprising:

a card initialization terminal, means for combining two out of the three members of a set consisting of user information (UI), a card issuer identification number (ID), and the serial number (SN) to obtain a checksum, and means for performing an exclusive OR operation on the checksum and a third member of the set consisting of UI, ID, and SN to obtain a composite result, said card initialization terminal including means for storing a digital signature on the card, the digital signature comprising the result of enciphering the composite result using the private key of a public key-private key pair, and means for storing the user information, the public key of the private key-public key pair, the issuer identification number, and a personal identification number on the card, said personal identification number being a function of the serial number and a password which is not stored on the card;

a processing terminal including means for reading the stored public key, the card issuer identification number, the serial number, the digital signature, and the personal identification number, and means for allowing a user of the card to enter a password;

means for processing the stored checksum, public key, card issuer number, and serial number, and digital signature to authenticate the card, said card authentication means including means for deciphering the digital signature using the public key stored on the card to recover the composite result, and means for performing an exclusive OR operation on the recovered composite result and one said third member of the set consisting of UI, ID and SN to recover the checksum, and means for comparing the stored checksum with a checksum computed by combining said two out of three members of the set consisting of UI, ID, and SN in order to authenticate the card; and means for processing the stored personal identification number and the entered password to authenticate the user of the card, said user identification means including means for computing a personal identification number which is to be compared with the stored personal identification number by computing said function of the serial number and the entered password.

2. A system as claimed in claim 1, wherein the means for combining two out of the three members of the set consisting of UI, ID, and SN comprises means for performing a one-way hash function on the user information and the issuer identification number.

3. A system as claimed in claim 1, wherein the means for performing an exclusive OR function comprises means for performing an exclusive OR function on the checksum and the serial number.

4. A system as claimed in claim 1, wherein the means for computing the personal identification number from the serial number and password includes means for enciphering the serial number using the password as a key.

5. A system for enciphering user information onto an information storage medium which prevents counterfeiting of the user information, comprising:

an initialization terminal, means for combining two out of the three members of a set consisting of the user information (UI), a card issuer identification number (ID), and the serial number (SN) to obtain a checksum, and means for performing another combining operation on the checksum and a third member of the set consisting of UI, ID, and SN to obtain a composite result, said initialization terminal including means for storing a digital signature on the medium, the digital signature comprising the result of enciphering the composite result using the private key of a public key-private key pair, and means for storing the user information, the public key of the private key-public key pair, and the issuer identification number.

6. A system as claimed in claim 5, wherein the means for combining two out of the three members of the set consisting of UI, ID, and SN comprises means for performing a one-way hash function on the user information and the issuer identification number.

7. A system as claimed in claim 5, wherein the means for performing another combining operation on the checksum and third member comprises means for performing an exclusive OR function on the checksum and the serial number.

8. A system as claimed in claim 5, further comprising means for computing a personal identification number and storing the personal identification number on the card, said personal identification number being a function of the serial number and a password which is not stored on the card.

9. A system as claimed in claim 8, wherein the means for computing the personal identification number from the serial number and password includes means for enciphering the serial number using the password as a key.

10. A system as claimed in claim 5, wherein the information storage medium is an integrated circuit card.

11. A system for authenticating information stored on an information storage medium, said information storage medium having stored thereon an unalterable unique serial number (SN), user information (UI), an issuer identification number (ID), a public key, and a digital signature, comprising:

a processing terminal including means for reading the stored public key, the issuer identification number, the serial number, the digital signature, and the personal identification number, and means for processing the stored checksum, public key, issuer number, and serial number, and digital signature, wherein said processing means includes means for deciphering the digital signature using the public key stored on the card to recover the composite result, and means for combining the recovered composite result and a third member of the set consisting of UI, ID and SN to recover the checksum, and means for authenticating the information stored on the information storage medium by comparing the stored checksum with a checksum computed by combining said two out of three members of the set consisting of UI, ID, and SN and determining said information to be authentic if said stored checksum and said computed checksum are equal.

12. A system as claimed in claim 11, wherein the means for combining two out of the three members of the set consisting of UI, ID, and SN comprises means for performing a one-way hash function on the user information and the issuer identification number.

13. A method as claimed in claim 11, wherein the step of combining said recovered composite result and said third member comprises the step of performing an exclusive OR function on the composite result and the serial number.

14. A system as claimed in claim 11, wherein the information storage medium is an integrated circuit card.

15. A system for authenticating the user of an information storage medium, said information storage medium having stored thereon an unalterable serial number and a personal identification number which is a function of the serial number and a password, comprising:
- a processing terminal which includes means for reading the personal information number stored on the medium, means for reading the serial number, and means for a user of the medium to enter the password into the terminal
- means for authenticating the user by by computing said function of the serial number read from the medium and the password entered by the user to obtain a computed personal identification number, and by comparing the computed personal identification number with the stored personal identification number, wherein said means for authenticating the user accepts the user as an authorized user if the computed PIN is identical to the stored PIN, and wherein said means for authenticating the user rejects the user if the computed PIN is not identical.

16. A system as claimed in claim 15, wherein the means for authenticating the user includes means for computing said function of the serial number read from the medium and the password entered by the user by enciphering the serial number read from the medium using the password entered by the user as a key.

17. A method of creating a counterfeit-proof media for identification or transaction purposes, comprising the steps of:
- providing an information storage medium having a unique, unalterable serial number (SN);
- providing user information (UI) to be stored on the medium;
- assigning an issuer identification number (ID) to an issuer of the medium and storing the issuer identification number on the medium;
- assigning a public key and a private key to the issuer and supplying the public key to the issuer for storage on the medium;
- combining two out of the three members of a set consisting of UI, ID, and SN to obtain a checksum;
- combining the checksum and a third of the three members of the set consisting of UI, ID, and SN to obtain a composite result;
- enciphering the composite result using the private key and the enciphering key to obtain a digital signature;
- storing the digital signature on the medium together with the issuer identification number and public key.

18. A method as claimed in claim 17, wherein the step of combining two out of the three members of the set consisting of UI, ID, and SN comprises the step of performing a one-way hash function on the user information and the issuer identification number.

19. A method as claimed in claim 17, wherein the step of combining the checksum and the third of the three members comprises the step of performing an exclusive OR function on the checksum and the serial number.

20. A method as claimed in claim 17, further comprising the step of storing on the medium a personal identification number which is a function of the serial number and a password.

21. A method as claimed in claim 20, wherein the step of storing the personal identification number comprises the step of enciphering the serial number using the password as the key.

22. A method as claimed in claim 17, wherein the step of providing the information storage medium comprises the step of providing an integrated circuit card.

23. A method as claimed in claim 17, wherein the step of combining two out of the three members of the set consisting of UI, ID, and SN comprises the step of performing a one-way hash function on the user information and the issuer identification number.

24. A method as claimed in claim 17, wherein the step of performing an exclusive OR function comprises the step of performing an exclusive OR function on the composite result and the serial number.

25. A method as claimed in claim 17, further comprising the steps of reading a pointer on the card and, if the pointer is not a null pointer, repeating the steps of deciphering, performing, computing, and comparing for a second information record stored on the medium and pointed to by said pointer, whereby the user information can be shared by more than one card issuer.

26. A method of authenticating an information storage medium having stored thereon a unique, unalterable serial number (SN), an issuer identification number (ID), user information (UI), a public key, and a digital signature, comprising the steps of:
- deciphering the digital signature using the public key to obtain a composite result;
- performing an exclusive OR operation on the composite result and a first member of the set consisting of SN, ID, and UI to obtain a recovered checksum;
- computing another checksum by combining a function of the second and third members of the set consisting of SN, ID, and UI to obtain a computed checksum; and authenticating the information storage medium by comparing the computed checksum with the recovered checksum, the information storage medium being authentic if said computed checksum is equal to said recovered checksum.

27. A method as claimed in claim 26 wherein the step of computing the PIN comprises the step of encrypting the serial number stored on the card, using the password as the key.

28. A method of authenticating the user of a card on which is stored information about the user, comprising the steps of:
- retrieving a serial number unique to the card;
- computing a personal identification number (PIN) as a function of a password and the unique serial number;
- comparing the computed PIN with a PIN stored on the card, and
- if the computed PIN is identical to the stored PIN, accepting the user as the authorized user and, if the computed PIN is not identical, rejecting the user.

29. A counterfeit-proof card, comprising:
- an integrated circuit having means for permanently affixing thereon a serial number unique to that integrated circuit, said serial number being in machine readable form; and information storage means included in said integrated circuit for storing a user record made up of the following information:

a digital key made up of an enciphered composite result, which in turn is the result of an exclusive OR operation performed on the serial number and a checksum, the checksum being a function of at least a portion of the user information to be stored on the card;

a digital string which includes the user information; and a key for deciphering the digital signature to obtain the composite result, from which the checksum can be recovered by performing another exclusive OR operation on the composite result and the serial number.

30. A card as claimed in claim 29, wherein the information stored on the card further includes an issuer identification number, said issuer identification number being associated with said key to enable the key to be retrieved for use in deciphering the digital signature, and said function of the user information being a one-way hash function of the issuer identification number and the user information.

31. A card as claimed in claim 29, further comprising a second user record made up of a second digital string, a second issuer identification number, and a second digital signature.

32. A universal transaction card, comprising:

means on the card for storing a first record provided by a first issuer for a first purpose and accessible by a computer based on a first individual card issuer identification number;

means on the card for storing at least one second record provided by a different card issuer for a second purpose and accessible by a computer based on a second individual card issuer identification number, and means on the card for storing, at least one third record containing shared information and accessible by a computer based on a pointer in each of said first and second records, wherein each card issuer record contains user information and a digital signature for authentication of the record, and a field containing said pointer to said third record in order to permit different card issuers to share user information.

33. A card as claimed in claim 32, wherein said card further includes a single personal identification number stored thereon for user authentication, said personal identification number including an encoded password, whereby only a single password need be memorized by the user in order to use the card for any of the different purposes for which the plurality of records are provided.

* * * * *